United States Patent
Jayasuriya et al.

(10) Patent No.: US 8,989,704 B2
(45) Date of Patent: Mar. 24, 2015

(54) INVISIBLE MODE FOR MOBILE PHONES TO FACILITATE PRIVACY WITHOUT BREACHING TRUST

(75) Inventors: Amesh Chanaka Jayasuriya, Nugegoda (LK); Rohan Dehigaspitiyage Don, Nugegoda (LK)

(73) Assignee: Symbol Technologies, Inc., Holtsville, NY (US)

( * ) Notice: Subject to any disclaimer, the term of this patent is extended or adjusted under 35 U.S.C. 154(b) by 957 days.

(21) Appl. No.: 12/332,139

(22) Filed: Dec. 10, 2008

(65) Prior Publication Data

US 2010/0144315 A1 Jun. 10, 2010

(51) Int. Cl.
  H04M 1/66 (2006.01)
  H04M 3/42 (2006.01)
  H04M 1/57 (2006.01)
  H04M 1/663 (2006.01)

(52) U.S. Cl.
  CPC ............ *H04M 3/42238* (2013.01); *H04M 1/57* (2013.01); *H04M 1/663* (2013.01); *H04M 2250/74* (2013.01)
  USPC ........... 455/411; 455/410; 455/413; 713/161; 713/170; 713/176

(58) Field of Classification Search
  USPC ............ 455/410–413, 415, 15; 713/161, 170, 713/176; 704/270, 270.1, 273
  See application file for complete search history.

(56) References Cited

U.S. PATENT DOCUMENTS

| | | | |
|---|---|---|---|
| 6,084,967 A | 7/2000 | Kennedy et al. | |
| 7,289,607 B2 * | 10/2007 | Bhargava et al. | 704/9 |
| 7,853,295 B1 * | 12/2010 | Fujisaki | 455/566 |
| 2004/0267538 A1 * | 12/2004 | Obuchi et al. | 704/277 |
| 2005/0227729 A1 | 10/2005 | Nakayama | |
| 2005/0267912 A1 | 12/2005 | Wada et al. | |
| 2006/0069567 A1 * | 3/2006 | Tischer et al. | 704/260 |
| 2006/0281458 A1 * | 12/2006 | Cai | 455/435.3 |
| 2007/0036298 A1 * | 2/2007 | Jain et al. | 379/88.19 |
| 2007/0185718 A1 | 8/2007 | Di Mambro et al. | |
| 2008/0005575 A1 | 1/2008 | Choyi et al. | |
| 2008/0051072 A1 * | 2/2008 | Kraft et al. | 455/418 |
| 2009/0041218 A1 * | 2/2009 | Sanchez | 379/142.01 |
| 2009/0296918 A1 * | 12/2009 | Becker | 379/219 |

* cited by examiner

*Primary Examiner* — Nimesh Patel
*Assistant Examiner* — Thai Vu (57) ABSTRACT

Systems and methods for providing information security in an unobtrusive manner are presented herein. An authentication component can enable a primary user of a multi-user communications device, based on an authentication process initiated by the primary user, to classify information stored in the multi-user communications device as invisible to other users of the device. The information classified as invisible to the other users can include phone number(s), phone message(s), email address(es), email(s), electronic message(s), call history, email history, and/or personal data. In addition, an information access component can enable the primary user to access the information classified as invisible to the other users of the multi-user communications device upon authentication of the primary user's identity. An operational component can enable other users of the multi-user communications device to operate the device without receiving an indication that information stored in the device was classified as invisible to the other users.

18 Claims, 11 Drawing Sheets

INVISIBLE MODE FOR MOBILE PHONES TO FACILITATE PRIVACY WITHOUT BREACHING TRUST

TECHNICAL FIELD

This disclosure relates generally to communications systems, and in particular, but not exclusively, relates to inconspicuously facilitating privacy in multi-user communications devices.

BACKGROUND

Invasion of privacy can result when a person's communications device (e.g., mobile phone, cellular phone, PDA, or the like) is used by another person. For example, when a person's cell phone is lost or stolen, unscrupulous individuals can gain access to the person's business and/or social contacts via information stored on the cell phone (e.g., incoming/outgoing call logs, contact lists, etc.). Conventional technology has addressed such concerns by requiring a primary user of the cell phone to successfully enter a password and/or personal identification number (PIN) before granting the primary user access to information stored on the cell phone.

However, when a communications device is commonly used by more than one person (e.g., in a workplace and/or family setting), intrusion of privacy can result in ways that can lead to mistrust, emotional distress, and/or disharmony between friends, family members, and/or coworkers. Although conventional technology can protect the privacy of a primary user of a communications device by requiring entry of a password/PIN known by the primary user, such protection can breed mistrust and disharmony between other users of the device since it is readily apparent that protection of privacy is required.

Therefore, there is a need to provide systems and methods operable on a multi-user communications device that can protect the privacy of the primary user of the device, without giving an impression that such protection is activated.

SUMMARY

The following presents a simplified summary of the innovation to provide a basic understanding of some aspects described herein. This summary is not an extensive overview of the disclosed subject matter. It is not intended to identify key or critical elements of the disclosed subject matter or delineate the scope of the subject innovation. Its sole purpose is to present some concepts of the disclosed subject matter in a simplified form as a prelude to the more detailed description that is presented later.

The claimed subject matter relates to systems and methods that discreetly protect privacy in multi-user communications devices. For example, when a person's cellular phone is lost or misplaced, any data stored on the phone (e.g., phone numbers, addresses, calendar information, call histories, etc.) becomes accessible to others. Conventional technology can protect against such invasions of privacy by requiring a primary user of the cell phone to enter a password or PIN to access information stored on the cell phone. However, when the primary user shares the cell phone, e.g., between friends, family members, and/or coworkers, such security measures can lead to mistrust and/or disharmony between the primary user and other users because the other users are aware that protection of privacy is required.

To correct for these and related shortcomings of conventional technology, the novel systems and methods of the claimed subject matter provide information security in an unobtrusive manner. According to one aspect of the disclosed subject matter, an authentication component can enable a primary user of a multi-user communications device, based on an authentication process initiated by the primary user, to classify information stored in the multi-user communications device as invisible to other users of the device. The information classified as invisible to the other users can include phone number(s), phone message(s), email address(es), email(s), electronic message(s), call history, email history, and/or personal data. In addition, an information access component can enable the primary user to access the information classified as invisible to the other users of the multi-user communications device upon authentication of the primary user's identity. An operational component can enable other users of the multi-user communications device to operate the device without receiving an indication that information stored in the device was classified as invisible to the other users.

In one aspect of the subject invention, the multi-user communications device can be a cellular phone, wireless communications device, or personal data assistant. In another aspect of the subject invention, the authentication process can include speaker verification, speaker authentication, voice recognition, voice authentication, image recognition, fingerprint authentication, and/or biometrics.

According to another aspect of the disclosed subject matter, a service access component, upon authentication of the primary user's identity via the multi-user communications device, can enable the primary user to communicate with persons associated with the information classified as invisible. In yet another aspect of the disclosed subject matter, the authentication component can authenticate the primary user's identity while an other person attempts to communicate with the primary user via the multi-user communications device. In this case, authentication component authenticates the primary user's identity without the other person perceiving the primary user's identity was authenticated during the attempted communication.

In another aspect of the subject invention, the authentication component can authenticate the primary user's identity while the primary user initiates communication with an other person via the multi-user communications device, without the other person perceiving the primary user's identity was authenticated during the initiated communication. According to yet another aspect of the subject invention, the information access component can enable the primary user to view data originating from phone numbers and/or email addresses classified as invisible to the other users, and/or view data sent to phone numbers and/or email addresses classified as invisible to the other users.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and methods for facilitating privacy in a multi-user communications device without breaching trust are described herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a process running on a processor, a processor, an object, an executable, a program, and/or a computer. By way of illustration, an application running on a server and the server can be a component. One or more components can reside within a process and a component can be localized on one computer and/or distributed between two or more computers.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Figure 1:
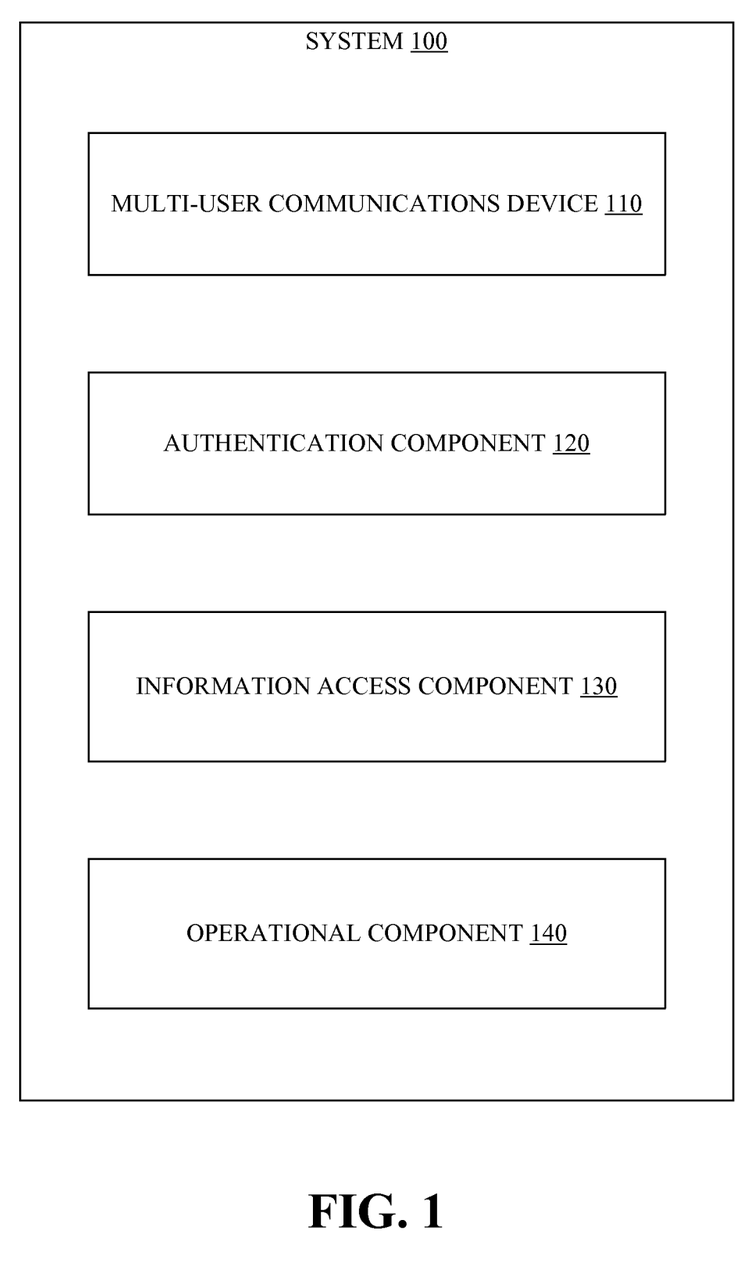
FIG. 1 illustrates a demonstrative system for inconspicuously facilitating privacy in a multi-user communications device, according to an embodiment of the invention.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. For example, in one embodiment, an artificial intelligence system can be used utilized in accordance with system 100 described below (e.g., to enable authentication component 120 to perform the authentication process, including speaker verification, speaker authentication, voice recognition, voice authentication, image recognition, fingerprint authentication, and/or biometrics).

Further, as used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices (e.g., hard disk, floppy disk, magnetic strips), optical disks (e.g., CD, DVD), smart cards, and flash memory devices (e.g., card, stick, key drive).

The subject invention provides systems and methods for facilitating privacy in a multi-user communications device without breaching trust. To this end, embodiments of the invention enable a primary user of a multi-user communications device to classify information stored in the device as invisible (e.g., secret) to other users of the device, so that the other users do not perceive such information was classified as invisible to the other users. FIG. 1 illustrates a demonstrative system 100 for inconspicuously facilitating privacy in a multi-user communications device, according to an embodiment of the invention. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

As illustrated by FIG. 1, system 100 can include a multi-user communications device 110, an authentication component 120, an information access component 130, and an operational component 140. It should be appreciated that multi-user communications device 110 can be any type of communications device, such as a telephone. In one example, multi-user communications device 110 can be a cellular phone. In other examples, multi-user communications device 110 can be any type of wireless communications device or personal data assistant. Authentication component 120 can enable a primary user of multi-user communications device 110 to classify information stored in multi-user communications device 110 as invisible to other users of multi-user communications device 110, based on an authentication process instigated by the primary user. In one embodiment, the information classified as invisible to the other users can include phone number(s), phone message(s), email address (es), email(s), electronic message(s), call history, email history, and/or personal data. However, it should be appreciated by one of ordinary skill in the art that any kind and/or type of information can be classified as invisible to the other users.

Further, in one embodiment as described infra, the primary user can instigate (e.g., activate) the authentication process by pressing one or more keys of the communications device. It should be appreciated by one of ordinary skill in the art that the primary user can instigate the authentication process by any means other than touch, such as through voice activation. In another embodiment of the subject invention, the authentication process can include at least one of speaker verification, speaker authentication, voice recognition, voice authentication, image recognition, fingerprint identification, or biometrics. However, it should be appreciated by one of ordinary skill in the art that the authentication process, described in more detail infra, can be any authentication process necessary to confirm, e.g., based on a predetermined threshold level of confidence, the identity of the primary user.

Now referring to FIG. 1, information access component 130 can enable the primary user of multi-user communications device 110 to access the information classified as invisible to the other users, upon authentication of the primary user's identity. Moreover, operational access component 140 can enable other users of multi-user communications device 1 10 to operate multi-user communications device 1 10 without receiving an indication that information stored in multi-user communications device 110 is classified as invisible to the other users. In this way, compared to conventional technology, embodiments of the subject invention can discreetly protect privacy without causing mistrust, emotional distress, and/or disharmony between friends, family members, and/or coworkers. Further, in one embodiment of the invention, information access component 130 can enable the primary user to view data originating from phone numbers and/or email addresses classified as invisible to the other users, and/or to view data sent to phone numbers and/or email addresses classified as invisible to the other users. It should be appreciated by one of ordinary skill in the art that information access component 130 can enable the primary user to access any information stored in multi-user communications device 110, and/or transferred via multi-user communications device 110.

Figure 2:
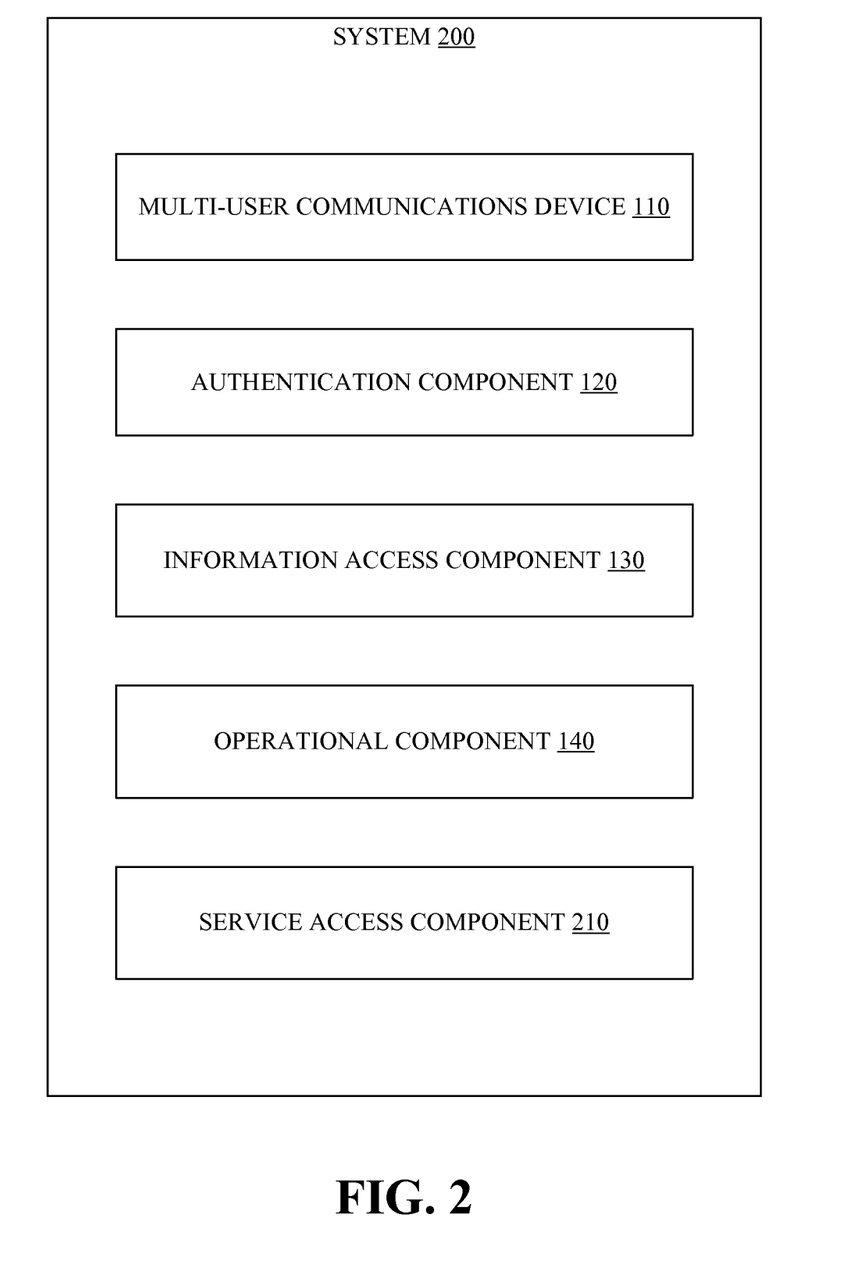
FIG. 2 illustrates another demonstrative system for inconspicuously facilitating privacy in a multi-user communications device, according to an embodiment of the invention.

Now referring to FIG. 2, a demonstrative system 200 for inconspicuously facilitating privacy in a multi-user communications device is illustrated, according to an embodiment of the invention. System 200 includes, in addition to the components of system 100, service access component 210. Service access component 210 can enable the primary user of multi-user communications device 110 to communicate with other persons via multi-user communications device 110, upon authentication of the primary user's identity. Importantly, the other persons are associated with the information classified as invisible to other users of multi-user communications device 110. For example, the information classified as invisible to the other users can be a phone number of at least one of the other persons, an email address of at least one of the other persons, or any other type of information associated with the other persons that the primary user can access in multi-user communications device 110 (e.g., addresses, other data, etc.).

FIGS. 3-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
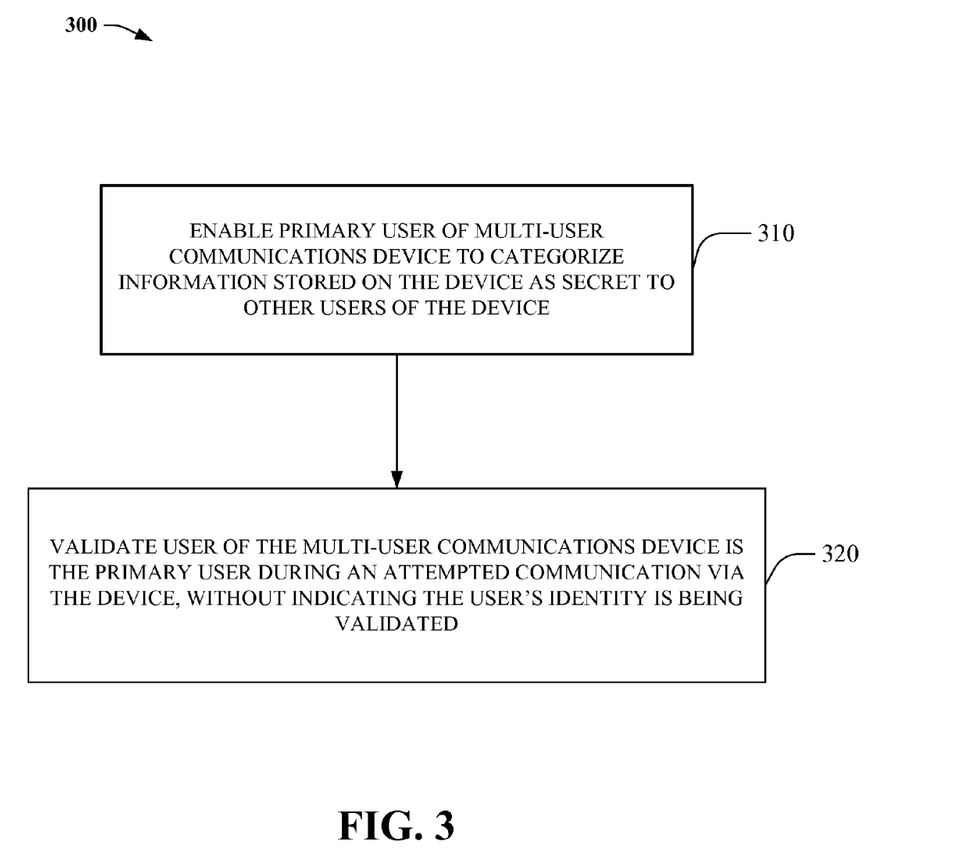
FIG. 3 illustrates a process for unobtrusively facilitating privacy in a multi-user communications device, according to an embodiment of the invention.

Referring now to FIG. 3, a process 300 for unobtrusively facilitating privacy in a multi-user communications device is illustrated, according to an embodiment of the invention. At 310, the primary user of a multi-user communications device can be enabled to categorize (e.g., classify, label, etc.) information stored on the multi-user communications device as secret (e.g., invisible, hidden, etc.) to other users of the multi-user communications device. As described supra in relation to systems 100 and 200, multi-user communications device 110 can be any type of communications device (e.g., a telephone, cellular phone, personal data assistant, wireless communications device, personal data assistant, or the like). Further, in one embodiment, the information stored on the multi-user communications device can include phone numbers, email addresses, mail addresses, and/or other data related to personal and/or professional contacts. It is to be understood and appreciated that any information the primary user wishes to store on multi-user communications device can be categorized as secret to other users of the multi-user communications device.

Returning now to FIG. 3, the identity of a user of multi-user communications device can be validated at 320 (i.e., identifying whether the user is the primary user) during an attempted communication via the device, without indicating to the user, or other person(s) associated with the attempted communication, that the identity of the user is being validated. It is to be appreciated that any method that validates whether the user of the device is the primary user, without indicating to the user or other persons that the validation occurred, can be performed at 320. Moreover, the attempted communication can occur when the user attempts to contact a person associated with secret information stored on multi-user communications device, or when a person associated with the secret information attempts to contact the primary user via the multi-user communications device. Thus, by verifying the identity of the primary user without indicating to the user or other persons that the identity of the primary user is being confirmed, process 300 facilitates privacy of the primary user without breaching trust among friends, co-workers, and/or family members.

Figure 4:
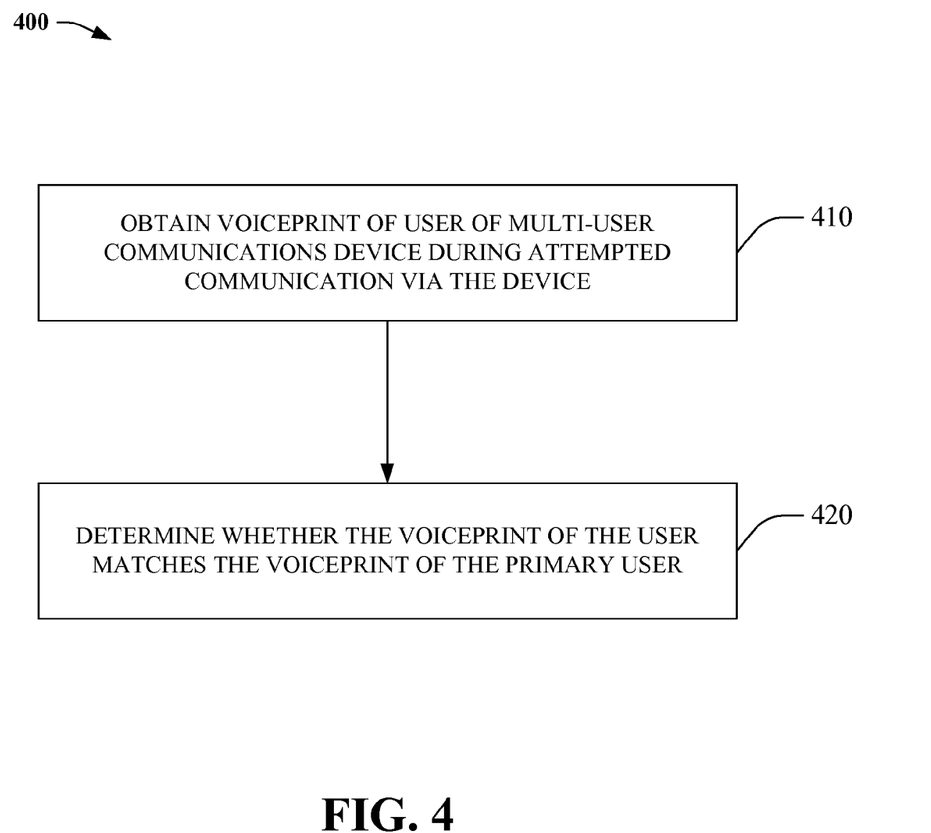
FIG. 4 illustrates a process for unobtrusively facilitating privacy by validating a voiceprint during an attempted communication, according to an embodiment of the invention.

Now referring to FIG. 4, a process 400 for unobtrusively facilitating privacy by validating a voiceprint during an attempted communication is illustrated, according to an embodiment of the invention. At 410, a voiceprint of a user of a multi-communications device can be obtained during an attempted communication via the multi-communications device. Further, at 420, it can be determined whether the voiceprint of the user matches the voiceprint of the primary user of the multi-user communications device. It should be appreciated that any attribute of the user's voiceprint can be compared with any attribute of the primary user's voiceprint. Further, it should be appreciated that a level of tolerance in matching of voiceprint attributes can be specified, and the determination of whether the voiceprint of the user matches the voiceprint of the primary user can be based on, at least in part, the level of tolerance. Moreover, it should be appreciated by one of ordinary skill in the art that any method of speaker verification, speaker authentication, voice recognition, and/or voice authentication can be utilized to determine whether the voiceprint of the user matches the voiceprint of the primary user. It is well known to one of ordinary skill in the art that various existing technologies can be used to process and store voiceprints, including frequency estimation, hidden Markov models, gaussian mixture models, pattern matching algorithms, neural networks, matrix representation, and/or decision trees. It should also be appreciated that other verification methods (e.g., fingerprint authentication, biometrics, etc.) can be utilized in addition to matching attributes of voiceprint(s).

Figure 5:
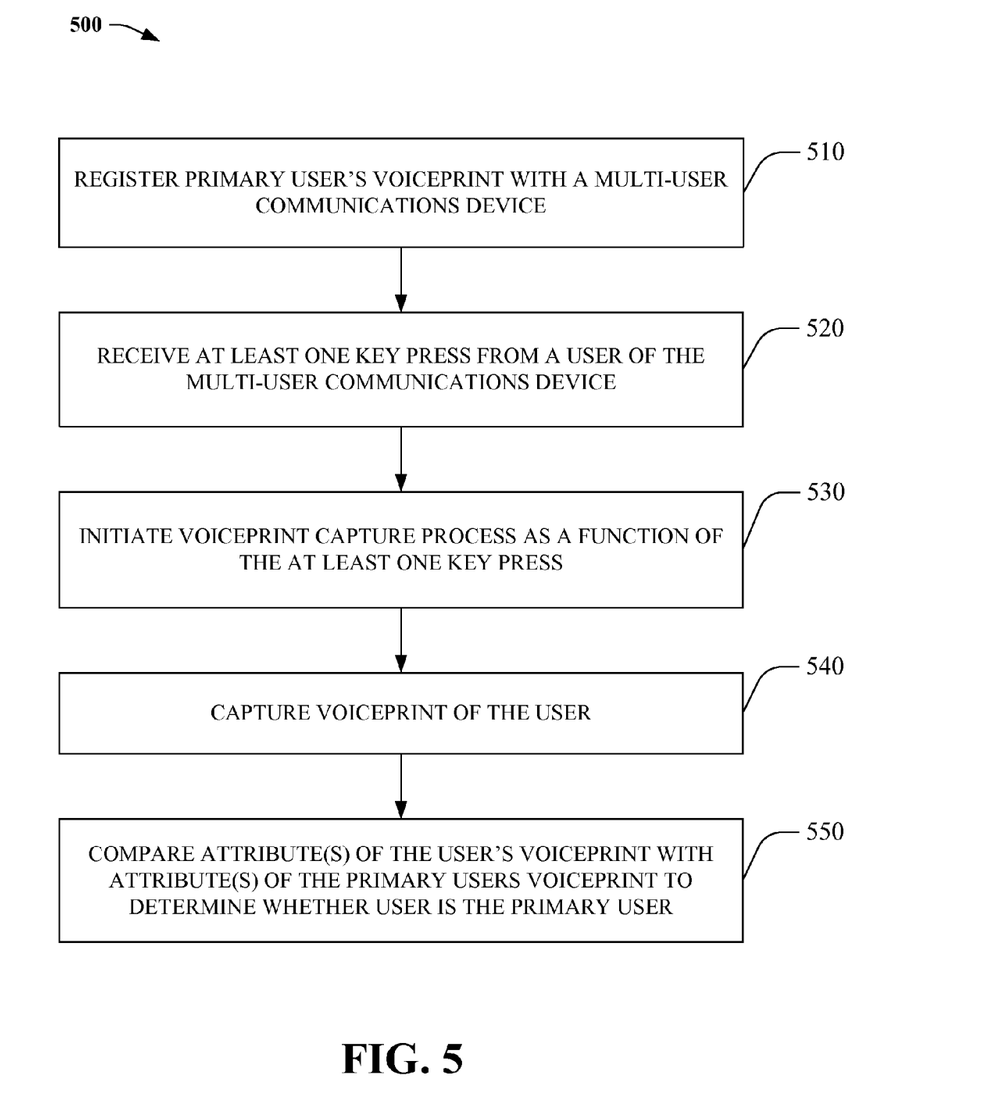
FIG. 5 illustrates an authentication process for enabling access to a multi-user communications device, according to an embodiment of the invention.

FIG. 5 illustrates an authentication process 500 for enabling access to a multi-user communications device, according to an embodiment of the invention. At 510, a voiceprint of a primary user of a multi-user communications device can be registered (or stored) within the multi-user communications device. As described supra, various technologies known to one of ordinary skill in the art can be used to process and store voiceprints. At 520, at least one key press of the multi-user communications device can be received when the primary user wishes to access information classified as invisible to other users of the multi-user communications device. It should be appreciated that any combination of key presses can be received. A voiceprint capture process, e.g. described supra, can be initiated at 530 based on the at least one key press. For example, if the at least one key press is recognized as a valid key press (e.g., the key press(es) match key press(es) predetermined by the primary user to facilitate access to information invisible to other users), a voiceprint capture process can be initiated at 530. At 540, the voiceprint of the user can be captured, and at 550, at least one attribute of the user's voiceprint can be compared with at least one attribute of the primary user's voiceprint registered at 510.

In one embodiment, upon authentication of the primary user's identity at 510, an information access component 110 (see e.g. systems 100-200 described supra) can enable the primary user to perform at least one of the of the following acts: re-register the primary user's voiceprint; specify a period of inactivity of the multi-user communications device that, when reached, requires the primary user to initiate the voiceprint capture process in order to access the information classified as invisible to the other users; specify a tolerance of voiceprint matching; specify a window of time in which the voiceprint capture process waits for the primary user to speak before aborting the voiceprint capture process; specify how a user interface of the multi-user communications device indicates whether the multi-user communications device has authenticated the primary user's identity; specify the at least one key press to receive from the user during the authentication process; specify whether the authentication process authenticates the primary user's identity via entry of a code, instead of authenticating the primary user's identity via the voiceprint capture process; or specify whether a communication received from an other person is ignored or sent to voice mail when the voiceprint of the primary user fails authentication.

Figure 6:
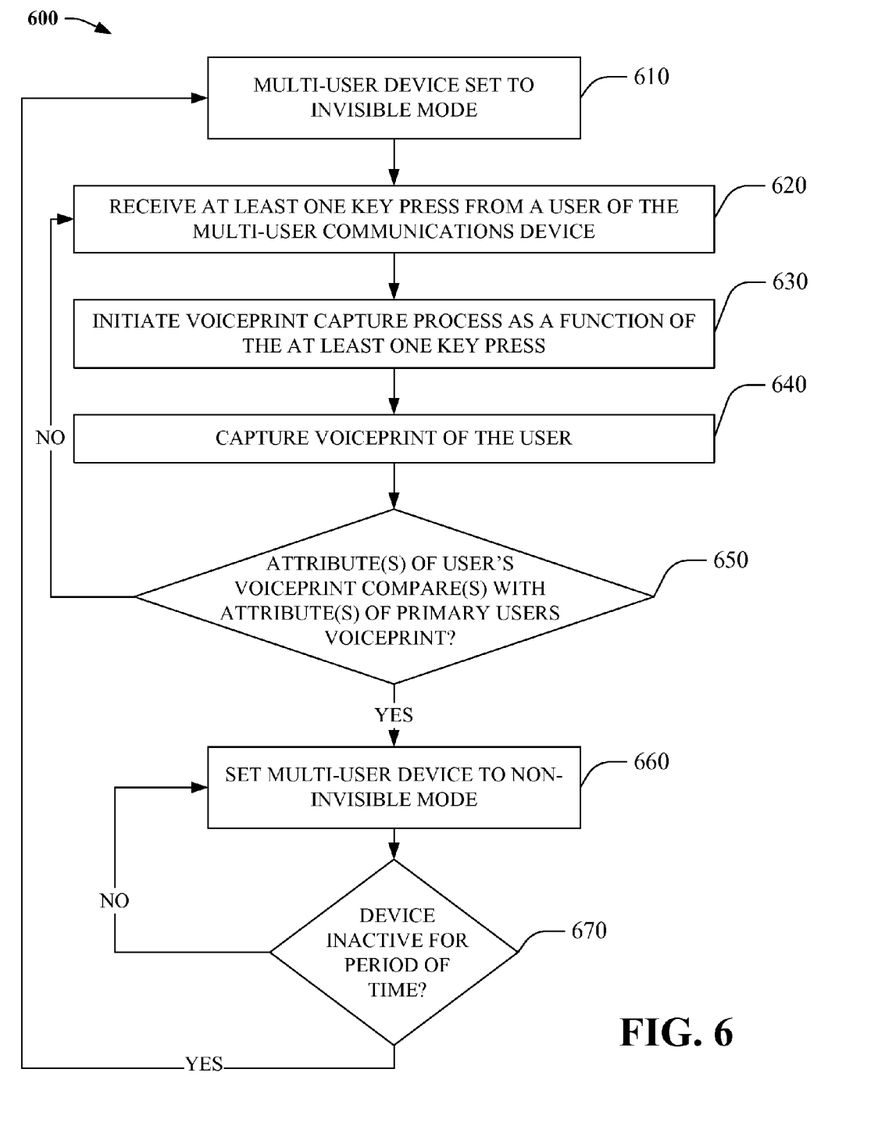
FIG. 6 illustrates another process for enabling access to a multi-user communications device, according to an embodiment of the invention.

FIG. 6 illustrates another process for enabling access to a multi-user communications device, according to an embodiment of the invention. At 610, a multi-user communications device can be set to invisible mode, in which the primary user of the device cannot classify and/or access information invisible to other users of the device until the identity of the primary user is authenticated. Similar to the steps described supra in reference to process 500, at least one user key press on the multi-user communications device can be received at 620; a voiceprint capture process of the user can be initiated at 630, based on the at least one key press; the voiceprint of the user can be captured at 640; and attribute(s) of the user's voiceprint can be compared with attribute(s) of the primary user's voiceprint at 650. If it is determined at 650 that attribute(s) of the primary user's voiceprint match attribute(s) of the primary user's voiceprint, the multi-user communications device can be set to non-invisible mode at 660, enabling the primary user to perform the acts described in relation to process 500, described supra. In one embodiment, if it is determined at 670 that the multi-user communications device was inactive for a predetermined period of time, flow continues from 660 to 610, in which the multi-user device can be set to invisible mode.

Figure 7:
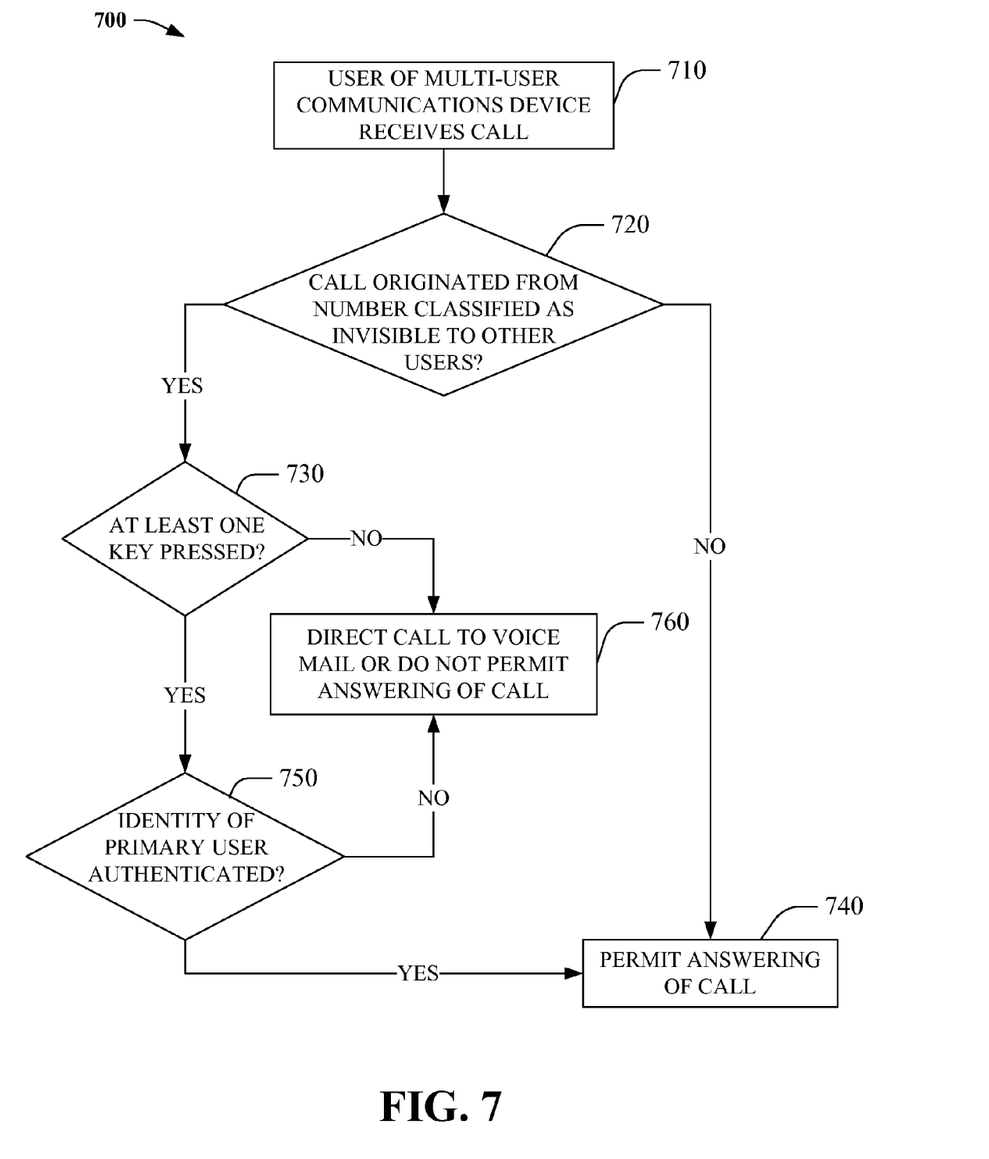
FIG. 7 illustrates a process for inconspicuously facilitating privacy when a call is received on a multi-user communications device, according to an embodiment of the invention.

Now referring to FIG. 7, a process 700 for inconspicuously facilitating privacy when a call is received on a multi-user communications device is illustrated, according to an embodiment of the invention. At 710, a user of a multi-user communications device can receive a call. It can be determined at 720 whether the call originated from a number classified as invisible to other users of the multi-user device. If it is determined that the call originated from a number classified as invisible to the other users, flow proceeds to 730, at which it can be determined whether at least one key was pressed on the multi-user communications device. However, if it is determined at 720 that the call did not originate from a number classified as invisible to the other users, flow proceeds to 740, at which the user of the multi-user communications device can be allowed to answer the call.

Returning to 730, if it is determined whether at least one key was pressed, the identity of the primary user can be authenticated at 750; otherwise, flow proceeds to 760, at which the call can be directed to voice mail, or is not allowed to be answered. As described supra in relation to process 500, it should be appreciated that any combination of key presses can be received, and if such combination of key presses is not recognized as a valid combination of key presses, flow can proceed to 760. If the primary user's identity was authenticated at 750, the primary user can be allowed to answer the call. In an embodiment of the subject invention, the calling party can continue to hear a ringing tone until the primary user's identity is authenticated at 750. Further, as described supra in relation to system 100, the user's identity can be authenticated by at least one of speaker verification, speaker authentication, voice recognition, voice authentication, image recognition, fingerprint identification, or biometrics. However, it should be appreciated by one of ordinary skill in the art that the user's identity can be authenticated by any authentication process necessary to confirm the identity of the primary user.

Figure 8:
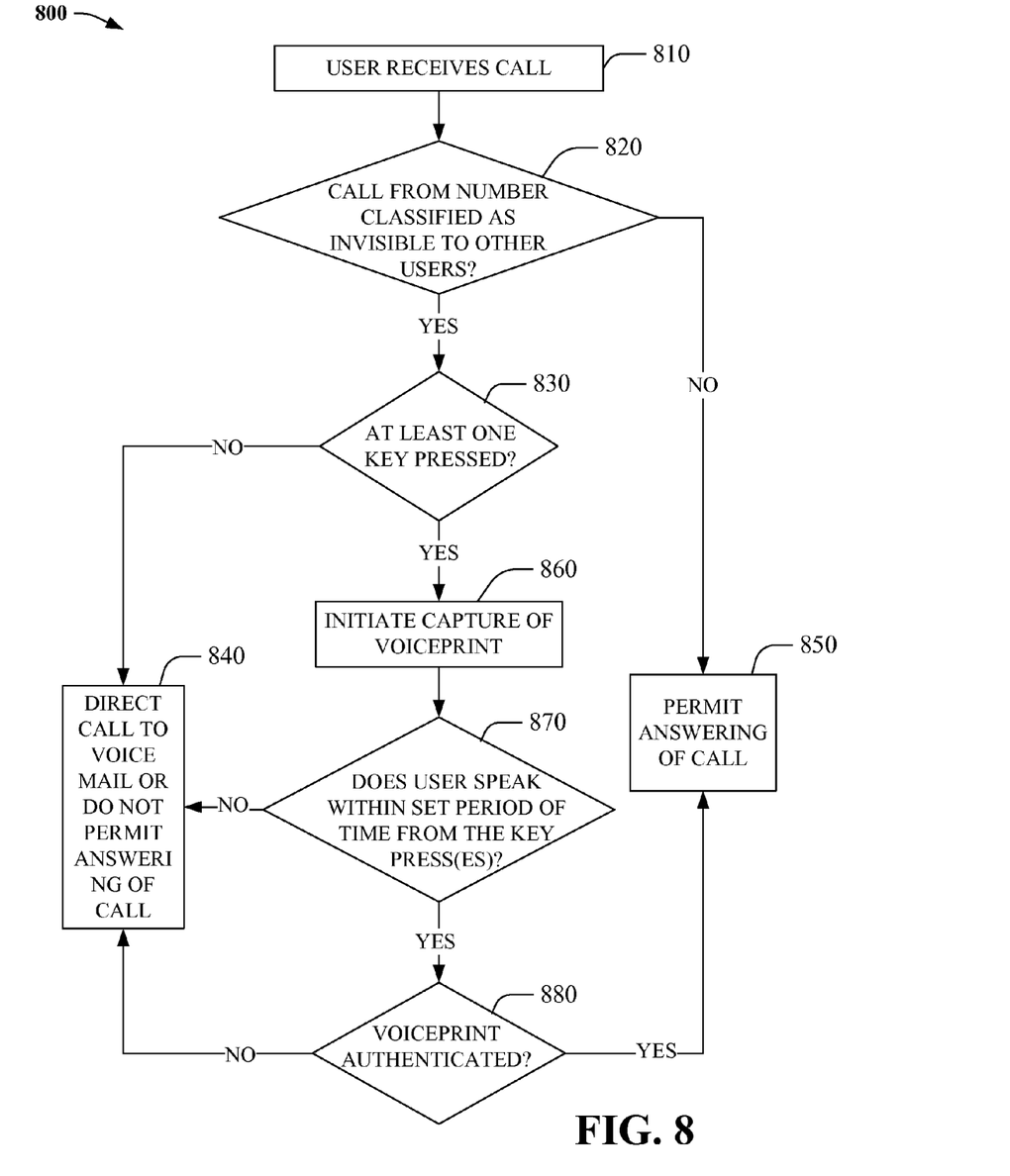
FIG. 8 illustrates another process for inconspicuously facilitating privacy when a call is received on a multi-user communications device, according to an embodiment of the invention.

FIG. 8 illustrates another process for inconspicuously facilitating privacy when a call is received on a multi-user communications device, according to an embodiment of the invention. Similar to the steps described supra in reference to process 700, a call can be received at 810; at 820, it can be determined whether the call originated from a number classified as invisible to other users of the multi-user communications device; if it was determined that the call originated from a number classified as invisible to the other users, flow can proceed to 830, at which it can be determined whether at least one key was pressed on the multi-user communications device. However, if it was determined at 820 that the call did not originate from a number classified as invisible to the other users, flow can proceed to 850, at which the user of the multi-user communications device can be allowed to answer the call.

Returning to 830, if it is determined that at least one key was pressed, and in an alternate embodiment (not shown), it is determined that the at least one key was recognized as a valid, a voiceprint capture process of the user can be initiated at 860, based on the at least one key press. However, if it was determined that at least one key was not pressed (or, additionally/alternatively, the at least one key press was not recognized as valid), flow can continue to 840, at which the received call can be directed to voice mail, or at which the user is not permitted to answer the call. If it was determined that at least one key was pressed (or, additionally/alternatively, the at least one key press was recognized as valid), flow can continue to 860, at which the voiceprint of the user is captured. At 870, it can be determined whether the user speaks within a predetermined period of time from which the at least one key was pressed. If it is determined that the user did not speak within the requisite period of time, flow continues to 840. However, if it was determined that the user spoke within the requisite period of time, the user's voice print can be authenticated at 880. If the user's voiceprint is not authenticated as the primary user's voiceprint, flow can proceed to 840; otherwise, flow proceeds to 850, in which the primary user is permitted to answer the call. In one embodiment (not shown), the calling party can continue to hear a ringing tone until the primary user's identity is authenticated at 880. In another embodiment, at least a part of the user's voiceprint can be replayed after flow proceeds to 840, so the primary user does not have to repeat, e.g., a greeting such as "Hello."

Figure 9:
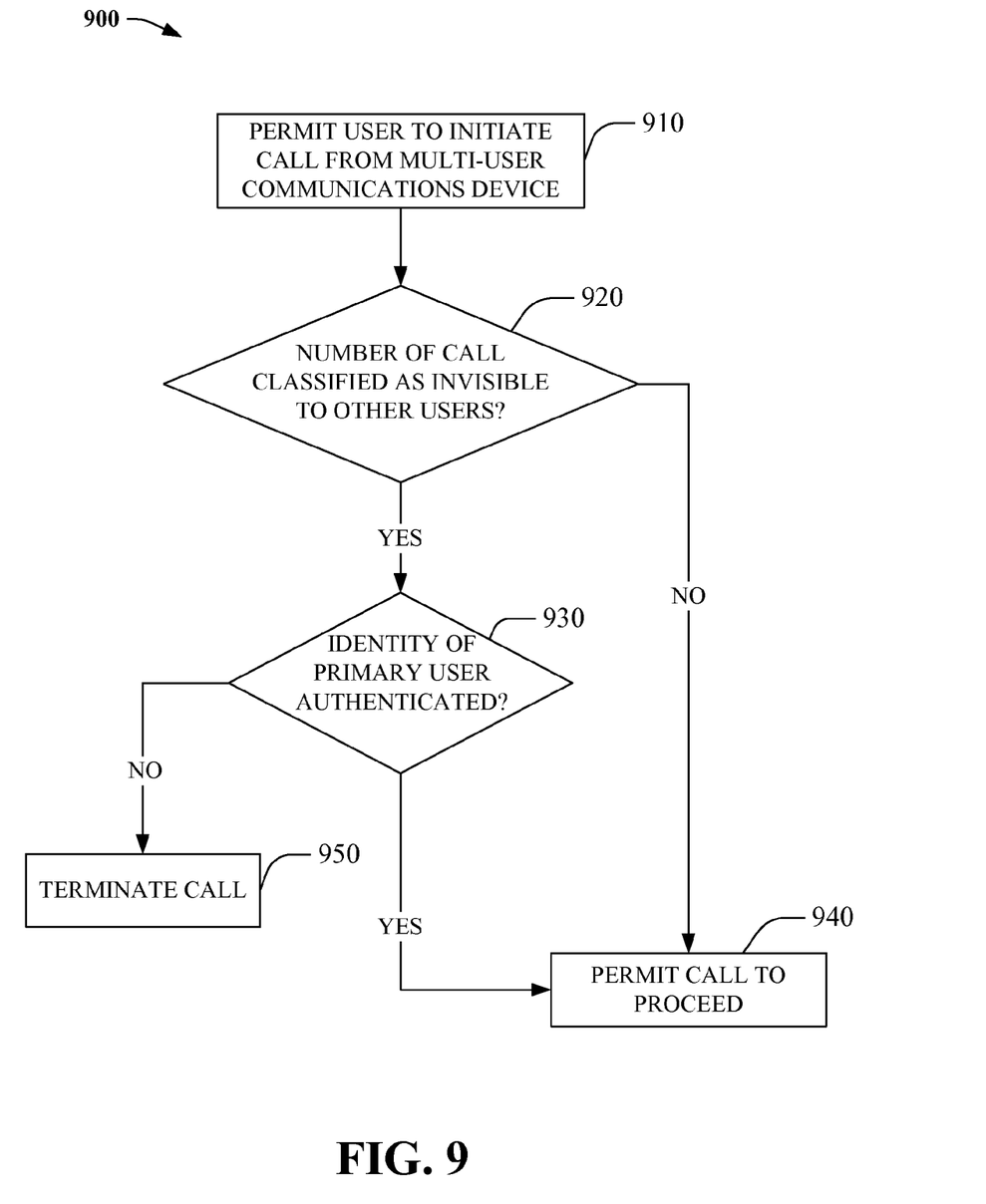
FIG. 9 illustrates a process for inconspicuously facilitating privacy when a call is made from a multi-user communications device, according to an embodiment of the invention.

FIG. 9 illustrates a process 900 for inconspicuously facilitating privacy when a call is made from a multi-user communications device, according to an embodiment of the invention. At 910, a user of the multi-user communications device can be permitted to initiate a call from the device. It can be determined, at 920, whether the phone number of the call is classified as invisible to other users of the multi-user communications device. If it was determined that the phone number was not classified as invisible to the other users, flow can proceed to 940, at which the call can be permitted to proceed. However, if it was determined that the phone number of the call is classified as invisible to the other users, flow can proceed to 930, at which the identity of the primary user can be authenticated. It should be appreciated that any method of authenticating the user's identity, which does not indicate to other persons that the user's identity is being validated, can be performed. In one embodiment, the primary user's identity can be authenticated by capturing a voiceprint of the user, and determining whether the voiceprint matches, e.g., to a specified tolerance, the voiceprint of the primary user. If the primary user's identity is not authenticated at 930, flow can proceed to 950, at which the call can be terminated and/or disconnected upon the authentication failure. In another embodiment, the voiceprint of the user can be captured within a set period of time—otherwise, the call can be terminated (as shown at 950). If it was determined that that the identity of the primary user was authenticated (e.g., the voiceprint of the user matches the voiceprint of the primary user), flow can proceed to 940, at which the call can be permitted to proceed.

Figure 10:
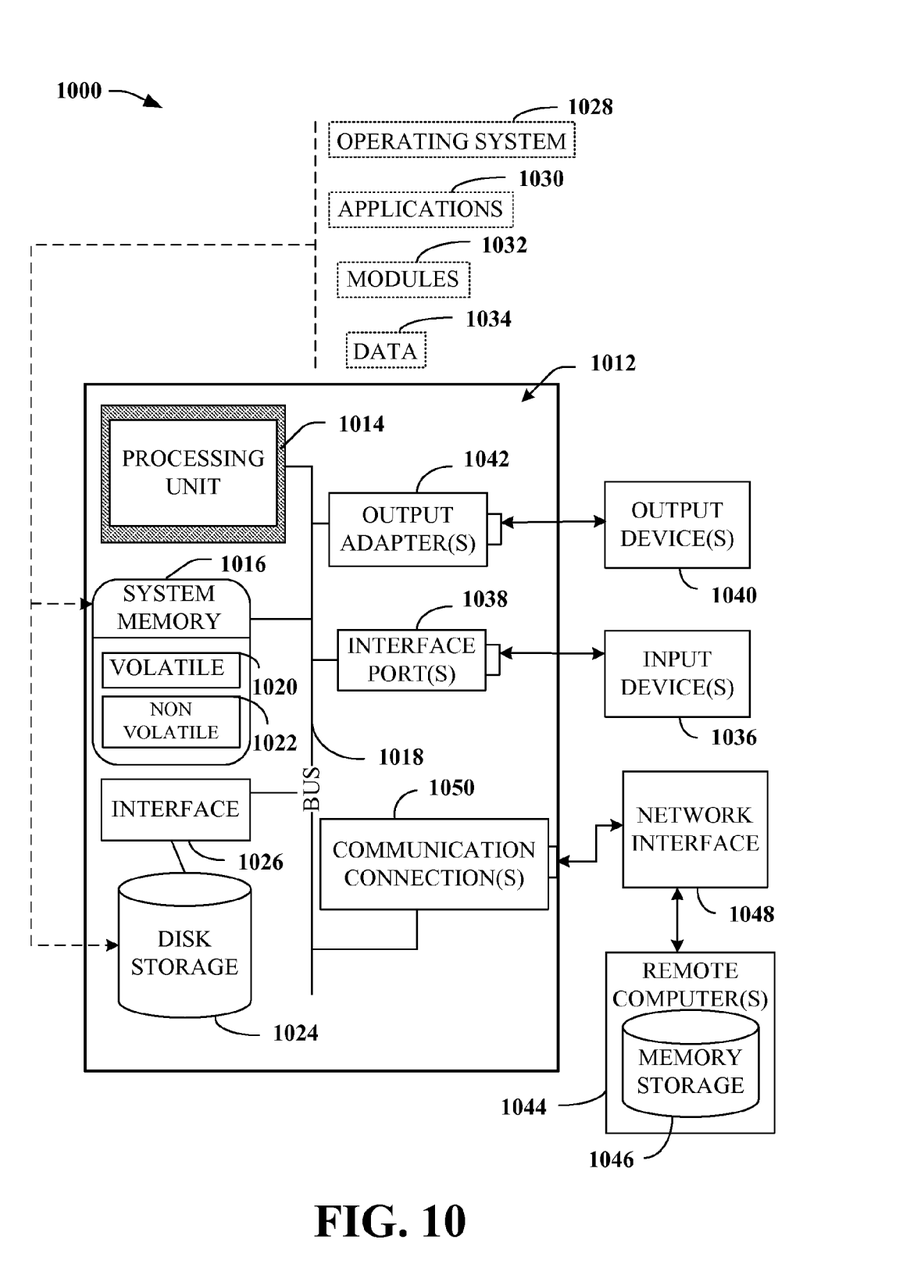
FIG. 10 illustrates a block diagram of a computer operable to execute the disclosed systems and methods, in accordance with an embodiment of the invention.
Figure 11:
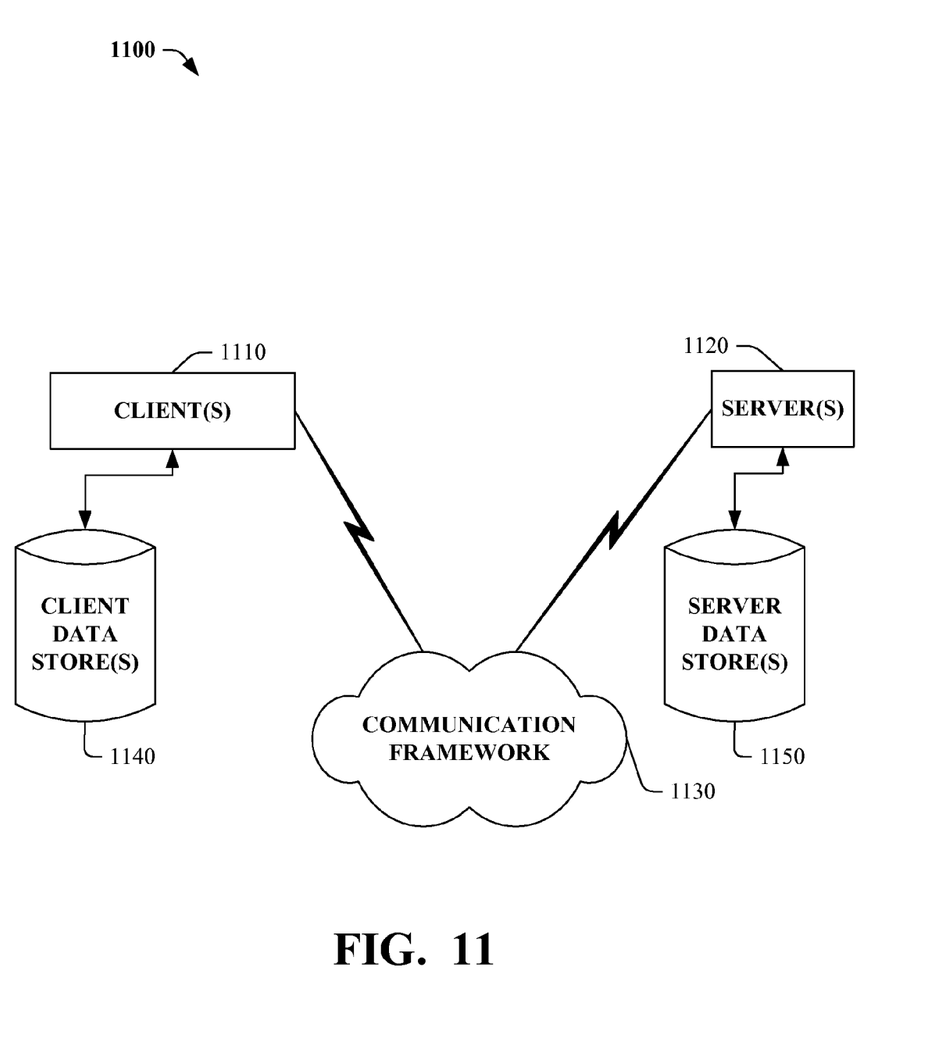
FIG. 11 illustrates a schematic block diagram of an exemplary computing environment, in accordance with an embodiment of the invention.

In order to provide a context for the various aspects of the disclosed subject matter, FIGS. 10 and 11, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, a block diagram of a computer 1000 operable to execute the disclosed systems and methods, in accordance with an embodiment of the invention, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ES-DRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user enters commands or information into the computer 1011 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 illustrates a schematic block diagram of an exemplary computing environment 1130, in accordance with an embodiment of the invention. The system 1100 includes one or more client(s) 1110. The client(s) 1110 can be hardware and/or software (e.g., threads, processes, computing devices). The system 1100 also includes one or more server(s) 1120. Thus, system 1100 can correspond to a two-tier client server model or a multi-tier model (e.g., client, middle tier server, data server), amongst other models. The server(s) 1120 can also be hardware and/or software (e.g., threads, processes, computing devices). The servers 1120 can house threads to perform transformations by employing the subject innovation, for example. One possible communication between a client 1110 and a server 1120 may be in the form of a data packet transmitted between two or more computer processes.

The system 1100 includes a communication framework 1130 that can be employed to facilitate communications between the client(s) 1110 and the server(s) 1120. The client(s) 1110 are operatively connected to one or more client data store(s) 1140 that can be employed to store information local to the client(s) 1110. Similarly, the server(s) 1120 are operatively connected to one or more server data store(s) 1150 that can be employed to store information local to the servers 1120.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for facilitating privacy in a multi-user communications device, the system comprising:
    an authentication component that enables a primary user of a multi-user communications device to classify information stored in the multi-user communications device as invisible to other users of the multi-user communications device based on an authentication process instigated by the primary user;
    an information access component that enables the primary user to access the information classified as invisible to the other users of the multi-user communications device upon authentication of the primary user's identity; and
    an operational component that enables the other users to operate the multi-user communications device without receiving an indication that information stored in the multi-user communications device was classified as invisible to the other users, wherein
    the authentication component is further configured to:
        receive an incoming communication to the multi-user communications device;
        determine whether the incoming communication originated from a number classified as invisible to the other users;
        permit the incoming communication to be accessed without authentication if the incoming communication did not originate from a number classified as invisible to the other users;
        determine whether one or more key presses occurred on the multi-user communications device if the incoming communication originated from a number classified as invisible to the other users;
        direct the incoming communication to voice mail or not permit accessing of the incoming communication if the one or more key presses did not occur;
        determine via a voiceprint capture process, after the one or more key presses occurred, whether the primary user attempted to access the incoming communication; and
        permit the incoming communication to be accessed upon authentication of the primary user's identity via the voiceprint capture process.

2. The system of claim 1, further comprising: a service access component that enables the primary user to communicate with other persons via the multi-user communications device upon authentication of the primary user's identity, wherein the other persons are associated with the information classified as invisible to the other users.

3. The system of claim 2, wherein the authentication component authenticates the primary user's identity while an other person attempts to communicate with the primary user via the multi-user communications device, without the other person perceiving the primary user's identity was authenticated during the attempted communication.

4. The system of claim 2, wherein the authentication component authenticates the primary user's identity while the primary user initiates communication with an other person via the multi-user communications device, without the other person perceiving the primary user's identity was authenticated during the initiated communication.

5. The system of claim 4, wherein the authentication component at least:
    permits initiation of a call from the multi-user communications device;
    determines whether the call is classified as invisible to the other users; and
    permits the call to proceed without authentication if the call is not classified as invisible to the other users.

6. The system of claim 5, wherein the authentication component:
    determines via a voiceprint capture process whether the primary user initiated the call; and
    permits the call to proceed upon authentication of the primary user's identity via the voiceprint capture process, or terminates the call if the voiceprint capture process does not authenticate the primary user's identity.

7. The system of claim 1, wherein the information classified as invisible to the other users comprises at least one of the following: a phone number, a phone message, an email address, an email, an electronic message, call history, email history, or personal data.

8. The system of claim 7, wherein the information access component enables the primary user to at least one of:
    view data originating from at least one of phone numbers classified as invisible to the other users or email addresses classified as invisible to the other users; or
    view data sent to at least one of phone numbers classified as invisible to the other users or email addresses classified as invisible to the other users.

9. The system of claim 1, wherein the multi-user communications device is at least one of a cellular phone, wireless communications device, or personal data assistant.

10. The system of claim 1, wherein the authentication process comprises at least one of speaker verification, speaker authentication, voice recognition, voice authentication, image recognition, fingerprint authentication, or biometrics.

11. The system of claim 10, wherein the authentication process further comprises:
    registering the primary user's voiceprint with the multi-user communications device;
    receiving at least one key press from a user of the multi-user communications device;
    initiating a voiceprint capture process based on the at least one key press;
    capturing the voiceprint of the user; and
    comparing at least one attribute of the voiceprint with at least one attribute of the registered voiceprint to authenticate the user's identity.

12. The system of claim 9, wherein the information access component enables the primary user, upon authentication of the primary user's identity, to at least one of: re-register the primary user's voiceprint;
    specify a period of inactivity of the multi-user communications device that, when reached, requires the primary user to initiate the voiceprint capture process in order to access the information classified as invisible to the other users; specify a tolerance of voiceprint matching;

specify a window of time in which the voiceprint capture process waits for the primary user to speak before aborting the voiceprint capture process;

specify how a user interface of the multi-user communications device indicates whether the multi-user communications device has authenticated the primary user's identity;

specify the at least one key press to receive from the user during the authentication process;

specify whether the authentication process authenticates the primary user's identity via entry of a code, instead of authenticating the primary user's identity via the voiceprint capture process; or specify whether a communication received from an other person is ignored or sent to voice mail when the voiceprint of the primary user fails authentication.

13. The system of claim 12, wherein the information access component requires the primary user to initiate the voiceprint capture process when the period of inactivity is reached.

14. The system of claim 1, wherein the voiceprint capture process directs the incoming communication to voice mail or does not permit accessing the incoming communication if the voiceprint capture process does not capture a voiceprint within a period of time after the one or more key presses occurred.

15. The system of claim 1, wherein the calling party continues to hear a ringing tone until the primary user's identity is authenticated via the voiceprint capture process.

16. The system of claim 15, wherein at least a portion of the primary user's speech is replayed after the primary user's identity is authenticated via the voiceprint capture process.

17. A method comprising:

enabling a primary user of a multi-user communications device to categorize information stored on the multi-user communications device as secret to other users of the multi-user communications device;

receiving an incoming communication to the multi-user communications device;

determining whether the incoming communication originated from a number classified as secret to the other users;

permitting the incoming communication to be accessed without authentication if the incoming communication did not originate from a number classified as secret to the other users;

determining whether one or more key presses occurred on the multi-user communications device if the incoming communication originated from a number classified as secret to the other users;

directing the incoming communication to voice mail or not permit accessing of the incoming communication if the one or more key presses did not occur;

determining via a voiceprint capture process, after the one or more key presses occurred, whether the primary user attempted to access the incoming communication; and permitting the incoming communication to be accessed upon authentication of the primary user's identity via the voiceprint capture process.

18. The method of claim 17, wherein authenticating the primary user's identity via the voiceprint capture process comprises:

obtaining a voiceprint of a user; and determining whether the voiceprint of the user matches the voice print of the primary user.

\* \* \* \* \*